(12) United States Patent
Liu

(10) Patent No.: US 8,816,701 B2
(45) Date of Patent: Aug. 26, 2014

(54) SLIDER AND ELECTRONIC APPARATUS CONTAINING THE SLIDER

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 183 days.

(21) Appl. No.: 13/424,581

(22) Filed: Mar. 20, 2012

(65) Prior Publication Data

US 2012/0241304 A1 Sep. 27, 2012

(30) Foreign Application Priority Data

Mar. 21, 2011 (CN) .......................... 2011 1 0067876

(51) Int. Cl.
*G06F 3/041* (2006.01)
(52) U.S. Cl.
USPC ............................ 324/661; 345/173; 345/178
(58) Field of Classification Search
USPC .................... 324/661, 686; 345/173–178
See application file for complete search history.

(56) References Cited

U.S. PATENT DOCUMENTS

| | | | | |
|---|---|---|---|---|
| 5,402,075 | A * | 3/1995 | Lu et al. ........................ | 324/664 |
| 5,507,661 | A * | 4/1996 | Honda et al. ................... | 439/347 |
| 2008/0042281 | A1 * | 2/2008 | Abe .............................. | 257/751 |
| 2009/0015485 | A1 * | 1/2009 | Floyd et al. ............. | 343/700 MS |
| 2009/0058429 | A1 * | 3/2009 | Harris et al. ................... | 324/686 |
| 2010/0110644 | A1 * | 5/2010 | Loibl et al. .................... | 361/752 |

FOREIGN PATENT DOCUMENTS

| | | | |
|---|---|---|---|
| EP | 2182705 A1 * | 10/2008 | ............. H02M 1/02 |
| EP | 2 182 705 A1 | 5/2010 | |
| WO | 2009134289 A1 | 11/2009 | |

OTHER PUBLICATIONS

International Preliminary Report on Patentability corresponding to PCT/IB2012/000548, mailed on Oct. 3, 2013.
International Search Report, corresponding to PCT/IB2012/000548, mailed on Jul. 4, 2012.
Written Opinion of the International Searching Authority, corresponding to PCT/IB2012/000548, mailed on Jul. 4, 2012.

* cited by examiner

*Primary Examiner* — Melissa Koval
*Assistant Examiner* — Farhana Hoque
(74) *Attorney, Agent, or Firm* — Renner, Otto, Boisselle & Sklar, LLP

(57) ABSTRACT

A slider and an electronic apparatus containing the slider, the slider including upper and lower board bodies, a first metal part positioned on the upper board body and connected to a capacitive touch sensor, the capacitive touch sensor being arranged on the circuit board of an electronic apparatus containing the slider; and a second metal part positioned on the lower board body and connected to a ground end (terminal), the ground end being arranged on the circuit board of the electronic apparatus containing the slider; the first and second metal parts are respectively positioned at the same end of the upper board body and the lower board body, and the first and second metal parts constitute a capacitor, the capacitance of which provides for detecting the open mode and closed mode of the slider.

16 Claims, 2 Drawing Sheets

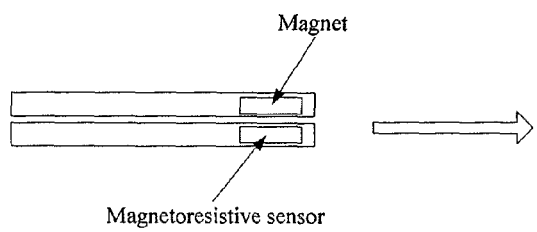
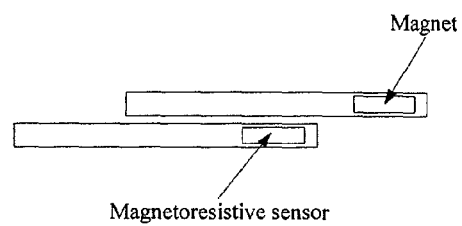
FIG. 1A
FIG. 1B
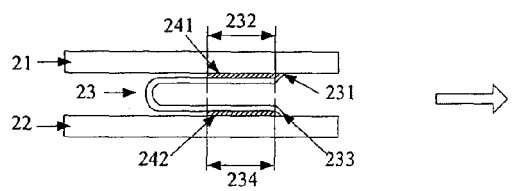
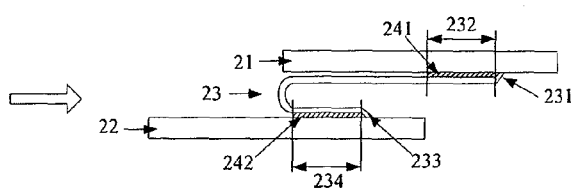
FIG. 2A
FIG. 2B
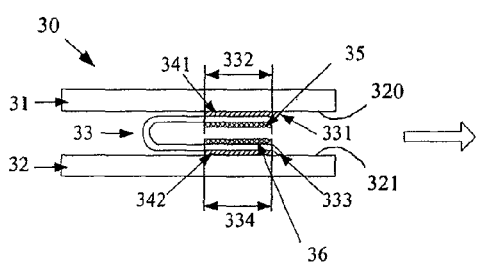
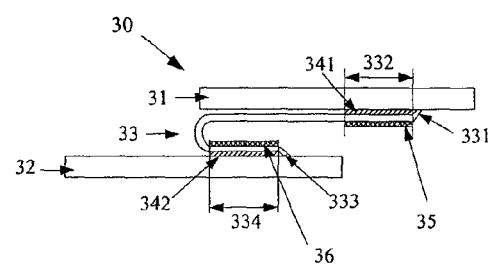
FIG. 3A
FIG. 3B

SLIDER AND ELECTRONIC APPARATUS CONTAINING THE SLIDER

FIELD OF THE INVENTION

The present invention relates to a slider and in particular, to a slider to detect the open and closed modes of the slider by using a metal part constituting a capacitor in combination with a capacitive sensor, and an electronic apparatus containing the slider.

BACKGROUND OF THE INVENTION

At present, various electronic apparatuses, such as a telephone, a computer, a personal computer, a notebook computer, a personal digital assistant (PDA), a cellular phone (mobile phone), or other portable electronic apparatuses, are frequently used in daily lives and works of the people. Some of the electronic apparatuses have a slider to fulfill such functionalities as screen scrolling, and key scrolling, etc.

In the design of a slider, the open and closed modes of the slider are mainly detected by a magnetic sensor, such a magnetoresistive (MR) sensor, and a Hall sensor, etc. Sometimes, a mechanical key is also used to detect the open and closed modes of a slider.

FIGS. 1A and 1B (sometimes collectively referred to as "FIG. 1") are schematic diagrams showing that an MR sensor is used to detect the open and closed modes of a slider. As shown in FIG. 1, a magnet and an MR sensor are respectively arranged at the ends of the upper and lower parts of the slider. When the slider is in different operational modes, the relative positions of the MR sensor and the magnet are different. FIG. 1A illustrates the relative positions of the MR sensor and the magnet when the slider is in a closed mode. FIG. 1B illustrates the relative positions of the MR sensor and the magnet when the slider is in an open mode. Since the relative positions are different, the strengths of the magnetic field sensed by the MR sensor are different. As the strengths of the magnetic field are different, the resistance value of the MR sensor changes under the effect of the magnetic field. Whether the slider is in the closed mode or in the open mode may be detected through the changes of the resistance value of the MR sensor.

FIGS. 2A and 2B (sometimes collectively referred to as "FIG. 2") are schematic diagrams showing the structure of an existing slider in closed and open modes. As shown in FIG. 2, the slider comprises an upper board body 21, a lower board body 22 and an FPC 23 for connecting the upper board body 21 and the lower board body 22. One side of a first fixed section 232 close to a first end 231 of the FPC 23 is stuck to the lower surface of the upper board body 21 by a first adhesive film 241. One side of a second fixed section 234 close to a second end 233 of the FPC 23 is stuck to the upper surface of the lower board body 22 by a second adhesive film 242. When the slider is in the closed mode, as shown in FIG. 2A, the FPC is in a first state. And when the slider is in the open mode, as shown in FIG. 2B, the FPC is in a second state. The slider shown in FIG. 2 may be provided with a magnet at the upper board body 21 and a magnetoresistive sensor at the lower board body 22 in the manner shown in FIG. 1, so as to detect whether the slider is in the closed mode or the open mode.

However, it is necessary to arrange a magnet and a magnetoresistive sensor at the slider if the manner shown in FIG. 1 is adopted to detect the open mode and closed mode of the slider, which increasing the cost.

SUMMARY OF THE INVENTION

The present invention is proposed in view of the above defects in the prior art. The present invention is addressed to provide a slider to detect the open and closed modes of the slider by using a metal part constituting a capacitor in combination with a capacitive sensor, and an electronic apparatus containing the slider. Such a slider may detect its open mode and closed mode by a metal part constituting a capacitor and a capacitive sensor, which is more flexible in detection and easier in implementation in comparison with the prior art.

According to a first aspect of the present invention, there is provided a slider, comprising an upper board body and a lower board body, wherein the slider further comprises:

a first metal part positioned on the upper board body and connected to a capacitive touch sensor, the capacitive touch sensor being arranged on the circuit board of an electronic apparatus containing the slider; and a second metal part positioned on the lower board body and connected to a ground terminal, the ground terminal being arranged on the circuit board of the electronic apparatus containing the slider;

wherein the first metal part and the second metal part are respectively positioned at the same end of the upper board body and the lower board body, and the first metal part and the second metal part constitute a capacitor.

According to a second aspect of the present invention, there is provided a slider as described according to the first aspect, wherein the slider further comprises a flexible printed circuit for connecting the upper board body and the lower board body; wherein one side of a first fixed section close to a first end of the flexible printed circuit is fixed to the lower surface of the upper board body, and one side of a second fixed section close to a second end of the flexible printed circuit is fixed to the upper surface of the lower board body; and wherein the first metal part is a capacitive touch pad, the capacitive touch pad being arranged at the other side of the first fixed section; and the second metal part is a ground pad, the ground pad being arranged at the other side of the second fixed section.

According to a third aspect of the present invention, there is provided a slider as described according to the second aspect, wherein one side of the first fixed section is stuck to the lower surface of the upper board body by a first adhesive film, and one side of the second fixed section is stuck to the upper surface of the lower board body by a second adhesive film.

According to a fourth aspect of the present invention, there is provided a slider as described according to the second aspect, wherein when the slider is in a closed mode, the capacitive touch pad is arranged directly opposite to the ground pad.

According to a fifth aspect of the present invention, there is provided a slider as described according to the second aspect, wherein a part of the line of the capacitive touch pad is covered by a first isolated electromagnetic interference coating film on the other side of the first fixed section of the flexible printed circuit, first vias being arranged in the first isolated electromagnetic interference coating film, and the line of the capacitive touch pad being connected to the capacitive touch sensor through the first vias; and a part of the line of the ground pad is covered by a second isolated electromagnetic interference coating film on the other side of the second fixed section of the flexible printed circuit, second vias being arranged in the second isolated electromagnetic interference coating film, and the line of the ground pad being connected to the ground terminal through the second vias.

According to a sixth aspect of the present invention, there is provided a slider as described according to the fifth aspect, wherein the first vias and the second vias are multiple, respectively.

According to a seventh aspect of the present invention, there is provided a slider as described according to the second aspect, wherein a part of the line of the capacitive touch pad is stuck to the other side of the first fixed section of the flexible printed circuit by a first conductive glue film; and a part of the line of the ground pad is stuck to the other side of the second fixed section of the flexible printed circuit by a second conductive glue film.

According to an eighth aspect of the present invention, there is provided a slider as described according to the seventh aspect, wherein the first conductive glue film and the second conductive glue film are copper glue film, respectively.

According to a ninth aspect of the present invention, there is provided a slider as described according to the first aspect, wherein the first metal part is a first capacitive touch metal key arranged at the first end of the upper board body; and the second metal part is a second capacitive touch metal key arranged at the first end of the lower board body.

According to a tenth aspect of the present invention, there is provided a slider as described according to the first aspect, wherein the flexible printed circuit is a single layer hinge flexible printed circuit.

According to an eleventh aspect of the present invention, there is provided an electronic apparatus, the electronic apparatus comprising a circuit board and a capacitive touch sensor and a ground terminal arranged on the circuit board, wherein the electronic apparatus further comprises a slider, the slider comprising an upper board body and a lower board body, wherein the slider further comprises:

a first metal part positioned on the upper board body and connected to the capacitive touch sensor; and a second metal part positioned on the lower board body and connected to the ground terminal;

wherein the first metal part and the second metal part are respectively positioned at the same end of the upper board body and the lower board body, and the first metal part and the second metal part constitute a capacitor.

According to a twelfth aspect of the present invention, there is provided an electronic apparatus as described according to the eleventh aspect, wherein the slider further comprises a flexible printed circuit for connecting the upper board body and the lower board body; wherein one side of a first fixed section close to a first end of the flexible printed circuit is fixed to the lower surface of the upper board body, and one side of a second fixed section close to a second end of the flexible printed circuit is fixed to the upper surface of the lower board body; and wherein the first metal part is a capacitive touch pad, the capacitive touch pad being arranged at the other side of the first fixed section; and the second metal part is a ground pad, the ground pad being arranged at the other side of the second fixed section.

According to a thirteenth aspect of the present invention, there is provided an electronic apparatus as described according to the twelfth aspect, wherein a part of the line of the capacitive touch pad is covered by a first isolated electromagnetic interference coating film on the other side of the first fixed section of the flexible printed circuit, first vias being arranged in the first isolated electromagnetic interference coating film, and the line of the capacitive touch pad being connected to the capacitive touch sensor through the first vias; and a part of the line of the ground pad is covered by a second isolated electromagnetic interference coating film on the other side of the second fixed section of the flexible printed circuit, second vias being arranged in the second isolated electromagnetic interference coating film, and the line of the ground pad being connected to the ground terminal through the second vias.

According to a fourteenth aspect of the present invention, there is provided an electronic apparatus as described according to the twelfth aspect, wherein a part of the line of the capacitive touch pad is stuck to the other side of the first fixed section of the flexible printed circuit by a first conductive glue film; and a part of the line of the ground pad is stuck to the other side of the second fixed section of the flexible printed circuit by a second conductive glue film.

According to a fifteenth aspect of the present invention, there is provided an electronic apparatus as described according to the eleventh aspect, wherein the first metal part is a first capacitive touch metal key arranged at the first end of the upper board body; and the second metal part is a second capacitive touch metal key arranged at the first end of the lower board body.

The open and closed modes of a slider may be detected by the slider and the electronic apparatus containing the slider provided in the present invention. The detecting method is more flexible and easy to be carried out in comparison with the prior art.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment; prime reference numerals also may be used to designate parts that are similar to parts that are designated by the same unprimed reference numeral.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings. In the drawings:

FIGS. 1A and 1B are schematic diagrams showing that an open mode and a closed mode of a slider are detected using a magnetoresistive sensor;

FIGS. 2A and 2B are schematic diagrams showing the structure of an existing slider in the closed and open modes;

FIGS. 3A and 3B are schematic diagrams showing a slider of the first embodiment of the present invention in the closed and open modes;

DETAILED DESCRIPTION OF THE EMBODIMENTS

Figure 4A:
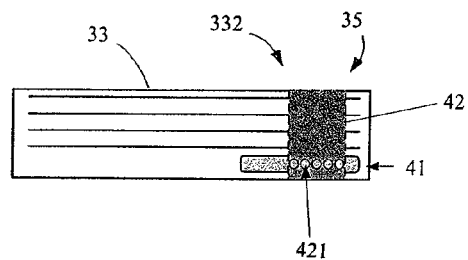
FIG. 4A is a schematic diagram showing the arrangement of a capacitive touch pad of the first embodiment of the present invention.

The interchangeable terms "electronic apparatus" and "electronic device" include portable radio communication apparatus. The term "portable radio communication apparatus", which hereinafter is referred to as a "mobile terminal", "portable electronic device", or "portable communication device", comprises all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

The preferred embodiments of the present invention are described as follows in reference to the drawings.

The slider provided in the present invention comprises an upper board body, a lower board body and an FPC for connecting the upper board body and the lower board body, wherein the slider provided in the present invention further comprises two metal parts which may be respectively arranged on the FPC (flexible printed circuit) for connecting the upper board body and the lower board body or may be respectively arranged on the upper board body and the lower board body. In the present invention, it is referred to as that the two metal parts are respectively positioned on the upper board body and the lower board body. For the convenience of description, the metal part positioned on the upper board body is referred to as a first metal part, and the metal part positioned on the lower board body is referred to as a second metal part. The slider of the present invention will be described in detail in the following in two embodiments.

FIGS. 3A and 3B (sometimes collectively referred to as "FIG. 3") are schematic diagrams showing a slider 30 of the first embodiment of the present invention in the closed and open modes. As shown in FIG. 3, the slider comprises an upper board body 31, a lower board body 32 and an FPC 33 for connecting the upper board body 31 and the lower board body 32. One side of a first fixed section 332 of the FPC 33 close to a first end 331 of the FPC 33 is stuck to the lower surface 320 of the upper board body 31 by a first adhesive film 341. One side of a second fixed section 334 of the FPC 33 close to a second end 333 of the FPC 33 is stuck to the upper surface 321 of the lower board body 32 by a second adhesive film 342. When the slider 30 is in the closed mode, as shown in FIG. 3A, the FPC is in a first state. And when the slider is in the open mode, as shown in FIG. 3B, the FPC is in a second state.

In this embodiment, a capacitive touch pad (the first metal part) 35 is arranged at the other side of the first fixed section 332, the capacitive touch pad 35 being connected to a capacitive touch sensor, and the capacitive touch sensor being arranged on a circuit board of an electronic apparatus containing the slider 30 of the present invention.

In this embodiment, a ground pad (the second metal part) 36 is arranged at the other side of the second fixed section 334, the ground pad 36 being connected to a ground terminal, and the ground terminal being arranged on a circuit board of an electronic apparatus containing the slider 30 of the present invention.

The capacitive touch pad 35 and the ground pad 36 are respectively positioned at the same end of the upper board body 31 and the lower board body 32, and the capacitive touch pad 35 and the ground pad 36 constitute a capacitor.

In this embodiment, one side of the first fixed section 332 of the FPC 33 is stuck to the lower surface 320 of the upper board body 31 by a first adhesive film 341, and one side of the second fixed section 334 of the FPC 33 is stuck to the upper surface 32 of the lower board body 32 by a second adhesive film 342; however, the present invention is not limited thereto. Other manners of attachment may be used, for example, one side of the first fixed section 332 close to the first end of the FPC may be fixed to the lower surface of the upper board body, and one side of the second fixed section 334 close to the second end of the FPC is fixed the upper surface of the lower board body also fall within the protection scope of the present invention.

As shown in FIG. 3A, when the slider 30 is in the closed mode, the capacitive touch pad 35 and the ground pad 36 are oppositely arranged. Since there exists a gap between the capacitive touch pad 35 and the ground pad 36, the capacitive value of the capacitor constituted by the capacitive touch pad 35 and the ground pad 36 is fixed, and it can be determined that the slider is in the closed mode.

As shown in FIG. 3B, when the slider 30 is in the open mode, the capacitive touch pad 35 and the ground pad 36 are away from each other, and the capacitive value of the capacitor constituted by the capacitive touch pad 35 and the ground pad 36 sharply decreases. Such a change may be detected by the capacitive touch sensor connected to the capacitive touch pad 35, and it can be determined that the slider is in the open mode.

The slider 30 of the present invention detects whether it is in the closed mode or the open mode through the change of the capacitance by the capacitive touch pad and ground pad arranged respectively at both ends of the FPC connecting the upper board body and the lower board body. The detecting method is more flexible and easier in implementation in comparison with the prior art.

According to an embodiment of the present invention, the capacitive touch pad and ground pad shown in FIG. 3 may be arranged on the FPC in a manner considering electromagnetic interference (EMI). In this embodiment, the FPC is a single layer hinge FPC. FIG. 4 (a) illustrates a schematic diagram showing the arrangement of a capacitive touch pad on the FPC in this manner, and FIG. 4 (b) illustrates a schematic diagram showing the arrangement of a ground pad on the FPC in this manner.

As shown in FIG. 4 (a), a conductive trace or line 41 of the capacitive touch pad 35 may be arranged on the other side of the first fixed section 332 of the FPC 33 and may be in parallel with the generally linear extent or direction of the FPC. A part of the conductive trace or line 41 of the capacitive touch pad is covered by a first isolated electromagnetic interference coating film 42 on the other side of the first fixed section of the FPC. First vias 421 are arranged in the first isolated electromagnetic interference coating film 42, and the conductive trace or line 41 of the capacitive touch pad is connected to the capacitive touch sensor through the first vias 421. In this embodiment, the first vias 421 may be multiple vias, e.g., as shown in the drawing.

Figure 4B:
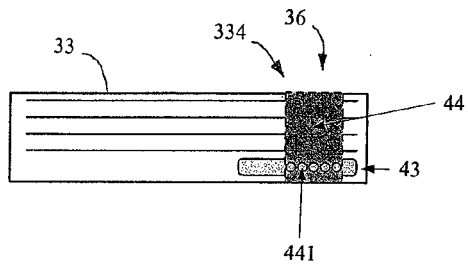
FIG. 4B is a schematic diagram showing the arrangement of a ground pad of the first embodiment of the present invention.

As shown in FIG. 4B, a conductive trace or line 43 of the ground pad 36 may be arranged on the other side of the second fixed section 334 of the FPC 33 and may be in parallel with the generally linear extent or direction of the FPC. A part of the conductive trace or line 43 of the ground pad 36 is covered by a second isolated electromagnetic interference coating film 44 on the other side of the second fixed section 334 of the FPC 33. Second vias 441 are arranged in the second isolated electromagnetic interference coating film 44, and the conductive trace or line of the ground pad 36 is connected to the ground terminal through the second vias 441. In this embodiment, the second vias 441 may also be multiple vias, e.g., as is shown in the drawing.

The slider of this embodiment, using standard electromagnetic interference coating film technology in the setup of the capacitive touch pad 35 and ground pad 36, may detect whether the slider is in the closed mode or the open mode. Although the cost is increased due to the addition of the single layer FPC 33, it is much cheaper than the multilayer solution in setting up the capacitive touch pad and ground pad.

Figure 5A:
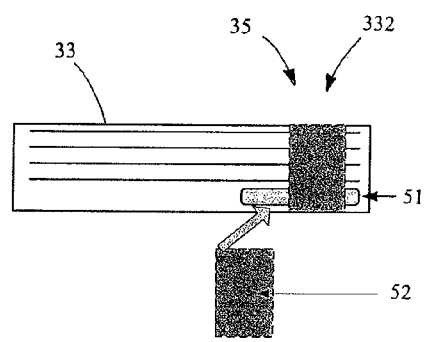
FIG. 5A is a schematic diagram showing the arrangement of a capacitive touch pad of the second embodiment of the present invention.

According to another embodiment of the present invention, the capacitive touch pad 35 and ground pad 36 shown in FIG. 3 may be arranged on the FPC 33 by a conductive glue film. In this embodiment, the FPC is a single layer hinge FPC. FIG. 5A is a schematic diagram showing the arrangement of a capacitive touch pad 35 on the FPC by using such a manner, and FIG. 5B shows a schematic diagram showing the arrangement of a ground pad 36 on the FPC by using such a manner.

As shown in FIG. 5A, a conductive trace or line 51 of the capacitive touch pad 35 is arranged on the other side of the first fixed section 332 of the FPC 33 and may be in parallel with the generally linear extent or direction of the FPC. A part of the conductive trace or line 51 of the capacitive touch pad 35 is stuck to the other side of the first fixed section 332 of the FPC by a first conductive glue film 52. The first conductive glue film 52 may be a copper glue film.

Figure 5B:
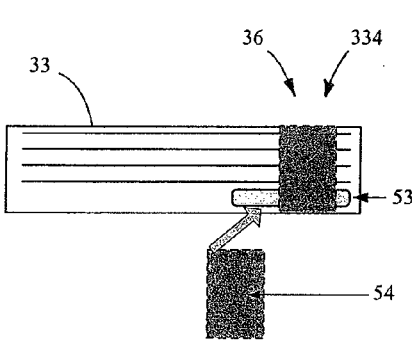
FIG. 5B is a schematic diagram showing the arrangement of a ground pad of the second embodiment of the present invention.

As shown in FIG. 5B, a conductive trace or line 53 of the ground pad 36 is arranged on the other side of the second fixed section 334 of the FPC 33 and may be in parallel with the generally linear extent or direction of the FPC. A part of the conductive trace or line 53 of the ground pad is stuck to the other side of the second fixed section of the FPC by a second conductive glue film 54. The second conductive glue film 54 may also be a copper glue film.

The slider of this embodiment, using a conductive glue film solution in the setup of the capacitive touch pad 35 and ground pad 36, may detect whether the slider is in the closed mode or the open mode. It is simple in implementation and low in cost.

On the basis of the slider shown in FIG. 3, the present invention also provides an electronic apparatus, the electronic apparatus comprising a circuit board and a capacitive touch sensor and a ground terminal arranged on the circuit board, wherein the electronic apparatus further comprises a slider, the slider comprising an upper board body, a lower board body and an FPC for connecting the upper board body and the lower board body. One side of a first fixed section close to a first end of the FPC is stuck to the lower surface of the upper board body by a first adhesive film, and one side of a second fixed section close to a second end of the FPC is stuck to the upper surface of the lower board body by a second adhesive film.

In this embodiment, a capacitive touch pad (the first metal part) is arranged at the other side of the first fixed section of the FPC, the capacitive touch pad 35 being connected to a capacitive touch sensor arranged on the circuit board as described above.

In this embodiment, a ground pad (the second metal part) is arranged at the other side of the second fixed section of the FPC, the ground pad 36 being connected to a ground terminal arranged on the circuit board as described above.

In this embodiment, the capacitive touch pad 35 and the ground pad 36 are respectively positioned at the same end of the upper board body and the lower board body of the slider, and the capacitive touch pad and the ground pad constitute a capacitor.

In this embodiment, when the slider is in the closed mode, the capacitive touch pad is arranged directly opposite to the ground pad.

In this embodiment, when the slider is in the closed mode, since there exists a gap between the capacitive touch pad and the ground pad of the slider, the capacitive value of the capacitor constituted by the capacitive touch pad and the ground pad is fixed, and it can be determined that the slider is in the closed mode. And when the slider is in the open mode, the capacitive touch pad and the ground pad are away from each other, and the capacitive value of the capacitor constituted by the capacitive touch pad and the ground pad greatly decreases, and it can be determined that the slider is in the open mode.

In this embodiment, the FPC is a single layer hinge FPC.

According to an embodiment of the present invention for the setup of the capacitive touch pad and the ground pad, a part of the conductive trace or line of the capacitive touch pad is covered by a first isolated electromagnetic interference coating film on the other side of the first fixed section of the FPC. First vias are arranged in the first isolated electromagnetic interference coating film, and the conductive trace or line of the capacitive touch pad is connected to the capacitive touch sensor arranged on the circuit board through the first vias. In this embodiment, a part of the conductive trace or line of the ground pad is covered by a second isolated electromagnetic interference coating film on the other side of the second fixed section of the FPC. Second vias are arranged in the second isolated electromagnetic interference coating film, and the conductive trace or line of the ground pad is connected to the ground terminal through the second vias. The first vias and the second vias may respectively be multiple vias.

According to another embodiment of the present invention for the setup of the capacitive touch pad 35 and the ground pad 36, a part of the conductive trace or line of the capacitive touch pad is stuck to the other side of the first fixed section of the FPC by a first conductive glue film. In this embodiment, a part of the conductive trace or line of the ground pad is stuck to the other side of the second fixed section of the FPC by a second conductive glue film. The first conductive glue film and the second conductive glue film may respectively be a copper glue film.

The slider of the electronic apparatus of this embodiment may be implemented by the slider shown in FIG. 3. The contents of the slider shown in FIG. 3 are incorporated herein as a part of this embodiment, which shall not be described any further.

The electronic apparatus of the present invention detects whether the slider is in the closed mode or the open mode through the change of the capacitance by the capacitive touch pad and ground pad arranged respectively at both ends of the FPC connecting the upper board body and the lower board body of the slider. The detecting method is more flexible and easier in implementation in comparison with the prior art.

Figure 6A:
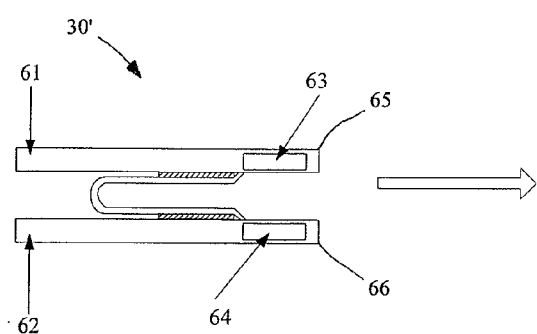
FIGS. 6A and 6B are schematic diagrams showing a slider of the second embodiment of the present invention in the closed and open modes.
Figure 6B:
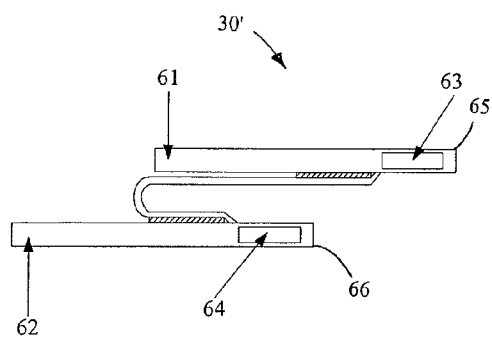

FIGS. 6A and 6B (sometimes collectively referred to as "FIG. 6") are schematic diagrams showing a slider 30' of the second embodiment of the present invention in the closed and open modes. As shown in FIG. 6, the slider comprises an upper board body 61, a lower board body 62 and an FPC (not shown in detail) for connecting the upper board body 61 and the lower board body 62. The connecting relationship between the FPC and the upper board body 61 and the lower board body 62 is the same as that shown in FIG. 3 and shall not be described any further.

In this embodiment, a first capacitive touch metal key (the first metal part) 63 is arranged at a first end 65 of the upper board body 61, the first capacitive touch metal key 63 being connected to a capacitive touch sensor, and the capacitive touch sensor being arranged on a circuit board of an electronic apparatus containing the slider of the present invention.

In this embodiment, a second capacitive touch metal key (the second metal part) 64 is arranged at a first end 66 of the lower board body 62, the second capacitive touch key being connected to a ground terminal, and the ground terminal being arranged on a circuit board of an electronic apparatus containing the slider of the present invention.

In this embodiment, the first capacitive touch key 63 and the second capacitive touch key 64 are respectively positioned at the same end of the upper board body and the lower board body of the slider, and the first capacitive touch key 63 and the second capacitive touch key 64 constitute a capacitor.

In this embodiment, the first end 65 of the upper board body 61 is adjacent to the first end 66 of the lower board body 62.

In comparison with the slider of the embodiment shown in FIG. 1, the slider 30' of the present embodiment uses a capacitive touch metal key, instead of a magnetoresistive sensor, to detect the open mode and closed mode of the slider. As shown in FIG. 6, capacitive touch metal keys 63, 64 are respectively arranged at one end of the upper board body and the lower board body of the slider 30'. The capacitive touch metal key 63 arranged at the upper board body of the slider is connected to a touch sensor, and the capacitive touch metal key 64 arranged at the lower board body of the slider is connected to the ground. The touch sensor is arranged on the circuit board of the electronic apparatus containing the slider 30', and the ground terminal is the ground of the electronic apparatus containing the slider. When the slider 30' is transferred from the closed mode (FIG. 6A) to the open mode (FIG. 6B), the touch sensor acquires the change of the operational mode of the slider through sensing the change of the capacitive value of the capacitor constituted by the capacitive touch metal keys 63, 64 arranged at the upper board body and the lower board body of the slider, thereby achieving the goal of detecting the closed mode and open mode of the slider.

On the basis of the slider shown in FIG. 6, the present invention further provides an electronic apparatus, the electronic apparatus comprising a circuit board and a capacitive touch sensor and a ground terminal arranged on the circuit board, wherein the electronic apparatus further comprises a slider, the slider comprising an upper board body, a lower board body and an FPC for connecting the upper board body and the lower board body. A first capacitive touch key is arranged at a first end of the upper board body, the first capacitive touch key being connected to the capacitive touch sensor as described above. A second capacitive touch key is arranged at a first end of the lower board body, the second capacitive touch key being connected to the ground terminal as described above.

In this embodiment, the first capacitive touch metal key 63 and the second capacitive touch metal key 64 are respectively positioned at the same end of the upper board body and the lower board body of the slider, and the first capacitive touch metal key and the second capacitive touch metal key constitute a capacitor.

In this embodiment, the first end of the upper board body of the slider is adjacent to the first end of the lower board body of the slider.

The slider of the electronic apparatus of this embodiment may be implemented by the slider 30' shown in FIG. 6. The contents of the slider shown in FIG. 6 are incorporated herein as a part of this embodiment, which shall not be described any further.

The electronic apparatus of the present invention detects whether the slider 30' is in the closed mode or the open mode through the change of the capacitance by the capacitive touch metal keys 63, 64 arranged respectively at one end of the upper board body and the lower board body of the slider. The detecting method is more flexible and easier in implementation in comparison with the prior art.

Although only preferred embodiments are selected to illustrate the present invention, various changes and modifications are readily made by those skilled in the art without departing from the scope of the present invention defined by the appended claims. The description of the above embodiments is illustrative only, and is not intended to limit the present invention that is defined by the appended claims and their equivalents.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A slider, comprising an upper board body and a lower board body, wherein the slider further comprises:
   a first metal part of a capacitive touch pad positioned on the upper board body and connected to a capacitive touch sensor, the capacitive touch sensor being arranged on a circuit board of an electronic apparatus containing the slider;
   a second metal part positioned on the lower board body and connected to a ground terminal, the ground terminal being arranged on the circuit board of the electronic apparatus containing the slider and the second metal part being a ground pad; and
   a flexible printed circuit for connecting the upper board body and the lower board body, wherein:
      the first metal part and the second metal part are respectively positioned at the same end of the upper board body and the lower board body; and
      the first metal part and the second metal part constitute a capacitor.

2. The slider as claimed in claim 1, wherein:
   one side of a first fixed section close to a first end of the flexible printed circuit is fixed to the lower surface of the upper board body, and one side of a second fixed section close to a second end of the flexible printed circuit is fixed to the upper surface of the lower board body;
   the capacitive touch pad being arranged at the other side of the first fixed section; and
   the ground pad being arranged at the other side of the second fixed section.

3. The slider as claimed in claim 2, wherein one side of the first fixed section is stuck to the lower surface of the upper board body by a first adhesive film, and one side of the second fixed section is stuck to the upper surface of the lower board body by a second adhesive film.

4. The slider as claimed in claim 2, wherein when the slider is in a closed mode, the capacitive touch pad is arranged directly opposite to the ground pad.

5. The slider as claimed in claim 2, wherein
   a part of a conductive trace portion of the capacitive touch pad covered by a first isolated electromagnetic interference coating film is on the other side of the first fixed section of the flexible printed circuit, first vias being arranged in the first isolated electromagnetic interference coating film, and the conductive trace portion of the capacitive touch pad being connected to the capacitive touch sensor through the first vias; and
   a part of a conductive trace portion of the ground pad covered by a second isolated electromagnetic interference coating film is on the other side of the second fixed section of the flexible printed circuit, second vias being arranged in the second isolated electromagnetic interference coating film, and the conductive trace portion of the ground pad being connected to the ground terminal through the second vias.

6. The slider as claimed in claim 5, wherein the first vias and the second vias are multiple, respectively.

7. The slider as claimed in claim 2, wherein
   a part of a conductive trace portion of the capacitive touch pad is stuck to the other side of the first fixed section of the flexible printed circuit by a first conductive glue film; and
   a part of a conductive trace portion of the ground pad is stuck to the other side of the second fixed section of the flexible printed circuit by a second conductive glue film.

8. The slider as claimed in claim 7, wherein the first conductive glue film and the second conductive glue film are copper glue film, respectively.

9. The slider as claimed in claim 1, wherein the first metal part is a first capacitive touch metal key arranged at the first end of the upper board body; and the second metal part is a second capacitive touch metal key arranged at the first end of the lower board body.

10. The slider as claimed in claim 1, wherein the flexible printed circuit is a single layer hinge flexible printed circuit.

11. An electronic apparatus, the electronic apparatus comprising a circuit board and a capacitive touch sensor and a ground terminal arranged on the circuit board, wherein the electronic apparatus further comprises a slider, the slider comprising an upper board body and a lower board body, wherein the slider further comprises:
   a first metal part of a capacitive touch pad positioned on the upper board body and connected to the capacitive touch sensor;
   a second metal part positioned on the lower board body and connected to the ground terminal, the second metal part being a ground pad; and
   a flexible printed circuit for connecting the upper board body and the lower board body, wherein:
      the first metal part and the second metal part are respectively positioned at the same end of the upper board body and the lower board body; and
      the first metal part and the second metal part constitute a capacitor.

12. The electronic apparatus as claimed in claim 11, wherein:
   one side of a first fixed section close to a first end of the flexible printed circuit is fixed to the lower surface of the upper board body, and one side of a second fixed section close to a second end of the flexible printed circuit is fixed to the upper surface of the lower board body;
   the capacitive touch pad being arranged at the other side of the first fixed section; and
   the ground pad being arranged at the other side of the second fixed section.

13. The electronic apparatus as claimed in claim 12, wherein
   a part of a conductive trace of the capacitive touch pad covered by a first isolated electromagnetic interference coating film is on the other side of the first fixed section of the flexible printed circuit, first vias being arranged in the first isolated electromagnetic interference coating film, and the conductive trace of the capacitive touch pad being connected to the capacitive touch sensor through the first vias; and
   a part of a conductive trace of the ground pad covered by a second isolated electromagnetic interference coating film is on the other side of the second fixed section of the flexible printed circuit, second vias being arranged in the second isolated electromagnetic interference coating film, and the conductive trace of the ground pad being connected to the ground terminal through the second vias.

14. The electronic apparatus as claimed in claim 12, wherein
a part of a conductive trace of the capacitive touch pad is stuck to the other side of the first fixed section of the flexible printed circuit by a first conductive glue film; and
a part of a conductive trace of the ground pad is stuck to the other side of the second fixed section of the flexible printed circuit by a second conductive glue film.

15. The electronic apparatus as claimed in claim 11, wherein the first metal part is a first capacitive touch metal key arranged at the first end of the upper board body; and the second metal part is a second capacitive touch metal key arranged at the first end of the lower board body.

16. A slider, comprising an upper board body and a lower board body, wherein the slider further comprises:
a first metal part positioned on the upper board body and connected to a capacitive touch sensor, the capacitive touch sensor being arranged on a circuit board of an electronic apparatus containing the slider and the first metal part being a capacitive touch pad;
a second metal part positioned on the lower board body and connected to a ground terminal, the ground terminal being arranged on the circuit board of the electronic apparatus containing the slider and the second metal part being a ground pad; and
a flexible printed circuit for connecting the upper board body and the lower board body, wherein:
the first metal part and the second metal part are respectively positioned at the same end of the upper board body and the lower board body; and
the first metal part and the second metal part constitute a capacitor;
a part of a conductive trace portion of the capacitive touch pad is covered by a first isolated electromagnetic interference coating film, first vias being arranged in the first isolated electromagnetic interference coating film, and the conductive trace portion of the capacitive touch pad being connected to the capacitive touch sensor through the first vias; and
a part of a conductive trace portion of the ground pad is covered by a second isolated electromagnetic interference coating film, second vias being arranged in the second isolated electromagnetic interference coating film, and the conductive trace portion of the ground pad being connected to the ground terminal through the second vias.

* * * * *